(No Model.) 2 Sheets—Sheet 1.
J. H. BREESE.
POCKET BOX FOR POSTAGE STAMPS.
No. 383,036. Patented May 15, 1888.
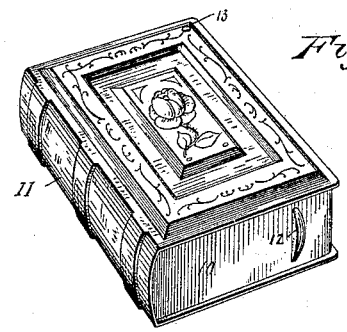
Fig. 1.
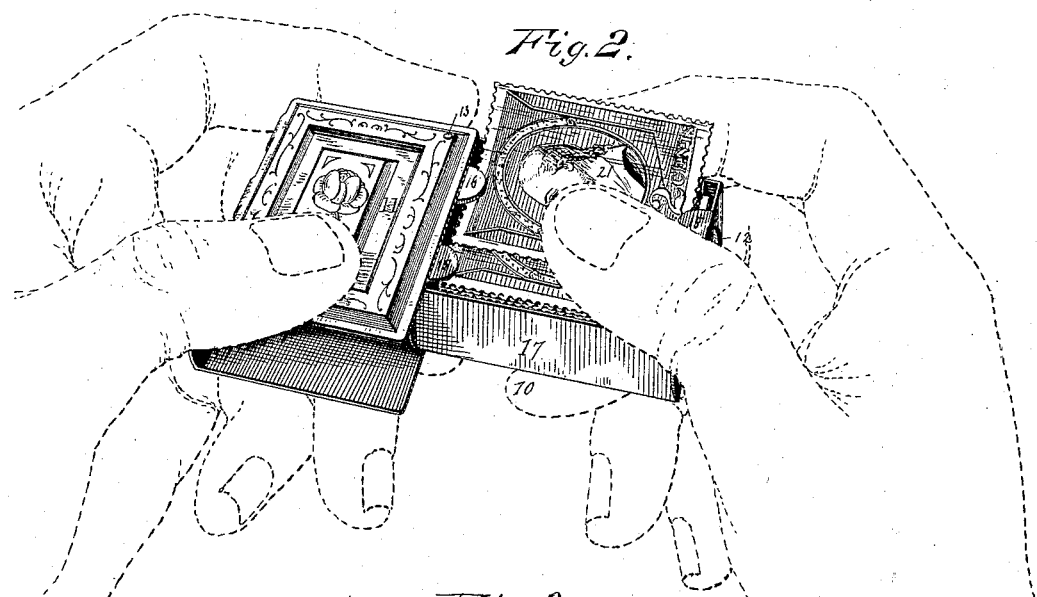
Fig. 2.
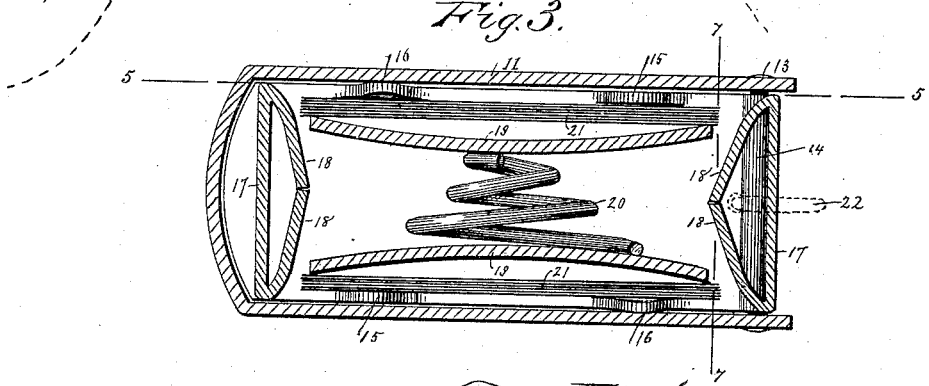
Fig. 3.
Fig. 4.
WITNESSES:
Harry King.
E. W. Weed.
INVENTOR:
John H. Breese,
By his Att'y,
J. C. Somes.

(No Model.) 2 Sheets—Sheet 2.

J. H. BREESE.
POCKET BOX FOR POSTAGE STAMPS.

No. 383,036. Patented May 15, 1888.

WITNESSES:

INVENTOR:

UNITED STATES PATENT OFFICE.

JOHN H. BREESE, OF MINNEAPOLIS, MINNESOTA.

POCKET-BOX FOR POSTAGE-STAMPS.

SPECIFICATION forming part of Letters Patent No. 383,036, dated May 15, 1888.

Application filed November 10, 1887. Serial No. 254,800. (No model.)

*To all whom it may concern:*

Be it known that I, JOHN H. BREESE, a citizen of the United States, residing at Minneapolis, in the county of Hennepin and State of Minnesota, have invented certain new and useful Improvements in Pocket-Boxes for Postage-Stamps, of which the following is a specification.

The object of this invention is to provide a pocket-receptacle for postage-stamps, which will be simple in construction, convenient in use, and attractive in appearance.

Figure 5:
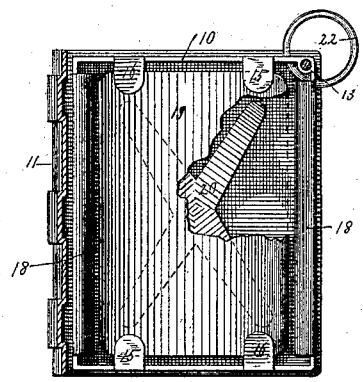
Figure 6:
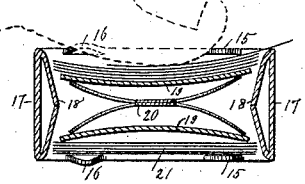
Figure 7:
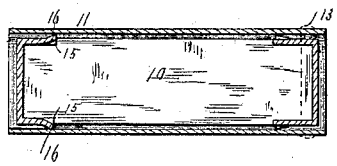

In the accompanying drawings, Figure 1 is a perspective view of this improved pocket-box for postage-stamps in closed position. Fig. 2 is a perspective view thereof in open position, illustrating the method of withdrawing a stamp therefrom. Fig. 3 is a transverse section thereof on an enlarged scale. Fig. 4 is a perspective view of one corner of the body of the box. Fig. 5 is a horizontal section on line 5 5 of Fig. 3, a curved spring being substituted for the conical spiral spring shown in Fig. 3. Fig. 6 is a central transverse section of Fig. 5. Fig. 7 is a longitudinal vertical section on line 7 7 of Fig. 3 on a smaller scale.

Similar numerals of reference indicate corresponding parts in the different figures.

This improved pocket-box for postage-stamps comprises a holder, 10, for containing the postage-stamps, and a casing, 11, for inclosing said holder. The casing 11 is preferably made in the form of an ornamented book-binding, and the holder is adapted to represent the leaves or filling of the book. Both the holder and its casing are preferably constructed of sheet metal. The holder is hinged at one corner to one corner of the casing, preferably to the upper outer corner thereof, and is provided at its lower end with a curved flange, 12, with which the thumb or finger engages for swinging it into open position. The hinging of the holder to the casing is effected by a pintle, 13, which passes through the upper and lower leaves of the casing and through a tube, 14, fixed in one corner of the holder, which tube serves to strengthen the holder and to prevent it from sagging when it is opened and closed.

The holder 10 is preferably rectangular in shape and slightly larger than a postage-stamp. This holder is open at its top and bottom, and is provided at its opposite ends, at its upper and lower edges, with lugs 15 and 16, which project inward over the stamps within the box for holding them therein. Two of these lugs, as 16, at diagonally-opposite points, are slightly bent outward, forming frictional spring-catches which press upon the inner faces of the inclosing-casing when the holder is shut therein, thus serving to hold the pocket-box closed. The spaces between these lugs serve to expose the figure indicating the denomination of the stamp.

The sides 17 of the hinged holder are provided at their opposite edges with inturned flanges 18, which meet at about the center of the sides, serving to strengthen the holder and forming inwardly-inclined aprons for guiding the postage-stamps outward as they are removed from the box.

Disposed within the box are two plates, 19, and a spring, 20, between said plates and attached thereto at its opposite ends, tends to press said plates outward toward the upper and lower faces of the holder against the lugs 15 and 16. The postage-stamps 21 are placed within the holder on the outer faces of the concave plates 19, between said plates and the lugs, said plates under the pressure of the spring serving to clamp said stamps against the lugs. The spring 20, as shown in Fig. 3, is in the form of a conical spiral, whereby it can be folded or compressed within a space equal to the diameter of the wire of which it is composed, so that almost the entire depth of the holder can be utilized for stamps. The plates 19 are concaved transversely on their outer faces in order to direct the edge of a stamp upward toward the opening as the stamp is pressed by the thumb or finger for removing it from the box, said plates thus co-operating with the inclined aprons 18 of the sides of the box to facilitate the removal of a stamp. The inclined aprons 18 tend to keep the curved plates in the center of the box, thus preventing the edges of the stamps from coming into contact with the sides and ends of the box.

The upward direction given to the stamps by the concave outer face of the plates 19 and by the inclined aprons 18 prevents the catching or tearing on the side of the box of the serrated edge of the stamp as it is being removed.

The operation is as follows: A number of stamps of a certain denomination are placed one above another and pushed into the holder under the lugs against the tension of the spring 20 onto one of the plates 19 and clamped face outward between said plate and the lugs. A number of stamps of another denomination are likewise inserted in the opposite face of the holder. The holder is then swung into the casing and held therein by the spring-pressure of the lugs against the casing. When a stamp is required for use, the holder is swung into open position, and a slight pressure of the thumb or finger upon the uppermost stamp serves to release it from the clamping action of the plate and lugs, and a lateral movement of the thumb or finger will cause said stamp to slide readily off from the stamps below, owing to its smooth gummed under surface, and the concavity of the plate and incline of the apron will direct it upward and outward at one side of the holder.

This improved pocket postage-stamp box may, if desired, be made of gold or silver, or may be plated with precious metal or with nickel, and provided with any suitable ornamentation. In this case a ring, 22, is passed through one corner of the box, preferably around the pivot thereof, whereby the device may be hung as a charm to a chain to be worn upon the person.

I claim—

1. The combination of a casing open at one end and one side, a holder hinged to said casing, said holder being open at its top and bottom and provided with inwardly-projecting lugs at its opposite ends, movable plates disposed within said holder, and a spring between said plates for forcing them outward in opposite directions, substantially as described.

2. The combination of a casing open at one end and one side, a holder hinged to said casing, said holder being open at its top and bottom and provided with inwardly-projecting lugs at its opposite ends, movable concave plates disposed within said holder, and a spring between said plates for forcing them outward in opposite directions, substantially as described.

3. The combination of a casing open at one end and one side, a holder hinged to said casing, said holder being open at its top and bottom and provided with inwardly-projecting lugs at its opposite ends, the sides of said holder being provided with inturned meeting flanges which form aprons inclined outward toward the top and bottom of the holder, movable plates disposed within said holder, and a spring between said plates for forcing them outward in opposite directions, substantially as described.

4. The combination of a casing open at one side and one end, a holder hinged to said casing, said holder being open at its top and bottom and provided with inwardly-projecting lugs at its opposite ends, certain of said lugs being sprung outward to serve as frictional catches for retaining the holder in closed position within the casing, movable plates disposed within said holder, and a spring between said plates for forcing them outward in opposite directions, substantially as described.

5. The combination of a casing open at one side and one end, a holder hinged to said casing, said holder being open at its top and bottom and provided with inwardly-projecting lugs at its opposite ends, a ring connected to one of said parts for attachment of a chain, movable plates disposed within said holder, and a spring between said plates for forcing them outward in opposite directions, substantially as described.

6. The combination of a casing open at one side and one end, a holder pivoted to said casing, said holder being open at its top and bottom and provided with inwardly-projecting lugs, movable plates disposed within said box, and a conical spiral spring disposed between said plates for forcing them outward in opposite directions, said spring being adapted to fold within itself, substantially as described.

7. A box for postage-stamps, comprising a holder having an open top provided with inwardly-projecting lugs, a spring within said holder, and a plate disposed within said holder and adapted to clamp the stamps against said lugs, said plate having a concave outer face whereby it is adapted to guide the stamps in upward direction in their removal from the box, substantially as described.

8. A skeleton box or holder for postage-stamps provided with inclined aprons which extend inward from opposite edges of the box for guiding the stamps in their removal, in combination with a plate or follower within said box, a spring for actuating said plate, and lugs or stops against which the stamps are clamped by said plate, substantially as described.

9. A box for postage-stamps, comprising a holder having an open top provided with inwardly-projecting lugs and with inclined aprons which extend inward from opposite edges of the box for guiding the stamps in their removal, a spring within said holder and a plate disposed within said holder and adapted to clamp the stamps against said lugs, said plate having a concave outer face whereby it is adapted to guide the stamps in upward direction onto the said inclined aprons, substantially as described.

10. A box for postage-stamps, comprising a holder having an open top and bottom provided with inwardly-projecting lugs, two movable plates within said holder provided with concave outer faces, and a spring interposed between said plates for forcing them outward to clamp the stamps against said lugs, substantially as described.

11. A skeleton box or holder for postage-stamps, provided with inclined aprons which extend inward from opposite edges of the box on both the upper and lower faces thereof, in combination with two plates or followers within said box, a spring interposed between said plates, and lugs or stops against which the stamps are clamped by said plates, substantially as described.

12. A skeleton box or holder for postage-stamps, provided with inclined aprons which extend inward from opposite edges of the box on both the upper and lower faces thereof, in combination with two plates or followers within said box provided with concave outer faces, a spring interposed between said plates, and lugs or stops against which the stamps are clamped by said plates, substantially as described.

JOHN H. BREESE.

Witnesses:
F. C. SOMES,
D. E. SOMES.